(12) United States Patent
Shaffer et al.

(10) Patent No.: US 8,817,061 B2
(45) Date of Patent: Aug. 26, 2014

(54) RECOGNITION OF HUMAN GESTURES BY A MOBILE PHONE

(75) Inventors: Shmuel Shaffer, Palo Alto, CA (US);
Mukul Jain, San Jose, CA (US);
Labhesh Patel, San Francisco, CA (US);
Sanjeev Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1503 days.

(21) Appl. No.: 11/824,655

(22) Filed: Jul. 2, 2007

(65) Prior Publication Data

US 2009/0009588 A1    Jan. 8, 2009

(51) Int. Cl.
*H04N 7/14*    (2006.01)

(52) U.S. Cl.
USPC ..................... 348/14.01; 348/14.08

(58) Field of Classification Search
USPC ............... 348/14.01, 14.02, 14.03, 14.05, 348/14.07–14.09, 14.1, 14.16
See application file for complete search history.

(56) References Cited

U.S. PATENT DOCUMENTS

| | | | |
|---|---|---|---|
| 4,805,210 A | 2/1989 | Griffith, Jr. | |
| 4,825,465 A | 4/1989 | Ryan | |
| 5,008,884 A | 4/1991 | Yazawa et al. | |
| 5,200,994 A | 4/1993 | Sasano et al. | |
| 5,206,905 A | 4/1993 | Lee et al. | |
| 5,220,599 A | 6/1993 | Sasano et al. | |
| 5,341,413 A | 8/1994 | Hori et al. | |
| 5,402,490 A | 3/1995 | Mihm, Jr. | |
| 5,432,844 A | 7/1995 | Core et al. | |
| 5,568,540 A | 10/1996 | Greco et al. | |
| 5,608,786 A | 3/1997 | Gordon | |
| 5,615,213 A | 3/1997 | Griefer | |
| 5,754,630 A | 5/1998 | Srinivasan | |
| 5,794,218 A | 8/1998 | Jennings et al. | |
| 5,905,448 A | 5/1999 | Briancon et al. | |
| 5,937,040 A | 8/1999 | Wrede et al. | |
| 5,959,662 A * | 9/1999 | Shaffer et al. | 348/14.08 |
| 5,974,142 A | 10/1999 | Heer et al. | |
| 5,999,599 A | 12/1999 | Shaffer et al. | |
| 6,044,081 A | 3/2000 | Bell et al. | |
| 6,259,405 B1 | 7/2001 | Stewart et al. | |

(Continued)

FOREIGN PATENT DOCUMENTS

| | | |
|---|---|---|
| EP | 1536645 | 6/2005 |
| EP | 1560140 | 8/2005 |

(Continued)

OTHER PUBLICATIONS

How to Build Smart Appliances, Albercht Schmidt, Kristof Van Laerhoven, IEEE Personal Communications, Aug. 2001, pp. 66-71.

(Continued)

*Primary Examiner* — Brandon Miller
(74) *Attorney, Agent, or Firm* — Baker Botts L.L.P.

(57) ABSTRACT

In one embodiment, a method includes electronically detecting a gesture of a user listening to a speaker via a communication device, and generating an audible and/or visual response that corresponds to the gesture. The audible and/or visual response is then communicated to the speaker. It is emphasized that this abstract is provided to comply with the rules requiring an abstract that will allow a searcher or other reader to quickly ascertain the subject matter of the technical disclosure.

13 Claims, 3 Drawing Sheets

(56) References Cited

U.S. PATENT DOCUMENTS

| | | | |
|---|---|---|---|
| 6,271,764 B1 | 8/2001 | Okamura | |
| 6,366,651 B1 | 4/2002 | Griffith et al. | |
| 6,373,817 B1 | 4/2002 | Kung et al. | |
| 6,421,544 B1 | 7/2002 | Sawada | |
| 6,438,600 B1 | 8/2002 | Greenfield et al. | |
| 6,522,726 B1 | 2/2003 | Hunt et al. | |
| 6,526,293 B1 | 2/2003 | Matsuo | |
| 6,542,586 B1 | 4/2003 | Helstab | |
| 6,545,596 B1 | 4/2003 | Moon | |
| 6,564,261 B1 | 5/2003 | Gudjonsson et al. | |
| 6,567,508 B2 | 5/2003 | Katayama | |
| 6,587,680 B1 | 7/2003 | Ala-Laurila | |
| 6,643,774 B1 | 11/2003 | McGarvey | |
| 6,654,455 B1 | 11/2003 | Isaka | |
| 6,665,534 B1 | 12/2003 | Conklin et al. | |
| 6,721,401 B2 | 4/2004 | Lee et al. | |
| 6,738,461 B2 | 5/2004 | Trandal et al. | |
| 6,766,007 B1 | 7/2004 | Dermler et al. | |
| 6,769,000 B1 | 7/2004 | Akhtar et al. | |
| 6,771,639 B1 | 8/2004 | Holden | |
| 6,792,296 B1 | 9/2004 | Van Bosch | |
| 6,792,297 B2 | 9/2004 | Cannon et al. | |
| 6,798,874 B1 | 9/2004 | Ohlinger et al. | |
| 6,799,052 B2 | 9/2004 | Agness et al. | |
| 6,804,334 B1 | 10/2004 | Beasley et al. | |
| 6,816,469 B1 | 11/2004 | Kung et al. | |
| 6,826,173 B1 | 11/2004 | Kung et al. | |
| 6,839,761 B2 | 1/2005 | Kadyk et al. | |
| 6,847,715 B1 | 1/2005 | Swartz | |
| 6,870,835 B1 | 3/2005 | Chen et al. | |
| 6,876,734 B1 | 4/2005 | Summers et al. | |
| 6,898,279 B1 | 5/2005 | Baker et al. | |
| 6,905,414 B2 | 6/2005 | Danieli et al. | |
| 6,907,123 B1 | 6/2005 | Schier | |
| 6,912,275 B1 | 6/2005 | Kaplan | |
| 6,917,672 B2 | 7/2005 | Brown et al. | |
| 6,918,034 B1 | 7/2005 | Sengodan et al. | |
| 6,928,558 B1 | 8/2005 | Allahwerdi et al. | |
| 6,931,001 B2 | 8/2005 | Deng | |
| 6,934,858 B2 | 8/2005 | Woodhill | |
| 6,947,417 B2 | 9/2005 | Laursen et al. | |
| 6,959,184 B1 | 10/2005 | Byers et al. | |
| 6,977,993 B2 | 12/2005 | Starbuck et al. | |
| 6,985,745 B2 | 1/2006 | Quaid | |
| 6,987,744 B2 | 1/2006 | Harrington et al. | |
| 7,042,989 B2 | 5/2006 | Lawson | |
| 7,085,244 B2 | 8/2006 | Koskelainen et al. | |
| 7,092,001 B2 * | 8/2006 | Schulz | 348/14.05 |
| 7,139,370 B1 | 11/2006 | Tse | |
| 7,189,132 B2 | 3/2007 | Nacik et al. | |
| 7,275,109 B1 | 9/2007 | Lee | |
| 7,333,614 B2 | 2/2008 | Jarosinski et al. | |
| 7,466,801 B2 | 12/2008 | Miller et al. | |
| 7,561,892 B2 | 7/2009 | Huh et al. | |
| 7,583,286 B2 * | 9/2009 | Brooksby et al. | 348/14.01 |
| 7,843,486 B1 * | 11/2010 | Blair et al. | 348/14.01 |
| 7,979,059 B2 * | 7/2011 | Rockefeller et al. | 455/414.1 |
| 2002/0010008 A1 | 1/2002 | Bork et al. | |
| 2002/0040936 A1 | 4/2002 | Wentker et al. | |
| 2002/0068537 A1 | 6/2002 | Shim et al. | |
| 2002/0086680 A1 | 7/2002 | Hunsinger | |
| 2002/0098831 A1 | 7/2002 | Castell et al. | |
| 2002/0140745 A1 | 10/2002 | Allenby et al. | |
| 2002/0167937 A1 | 11/2002 | Goodman | |
| 2002/0178228 A1 | 11/2002 | Goldberg | |
| 2002/0181691 A1 | 12/2002 | Miller et al. | |
| 2002/0198004 A1 | 12/2002 | Heie et al. | |
| 2003/0043992 A1 | 3/2003 | Wengrovitz | |
| 2003/0061496 A1 | 3/2003 | Ananda | |
| 2004/0003070 A1 | 1/2004 | Fernald et al. | |
| 2004/0024640 A1 | 2/2004 | Engle et al. | |
| 2004/0066932 A1 | 4/2004 | Seligmann | |
| 2004/0078349 A1 | 4/2004 | Syrjala et al. | |
| 2004/0121774 A1 | 6/2004 | Rajkotia et al. | |
| 2004/0128350 A1 | 7/2004 | Topfl et al. | |
| 2004/0131206 A1 | 7/2004 | Cao et al. | |
| 2004/0205330 A1 | 10/2004 | Godfrey et al. | |
| 2004/0248586 A1 | 12/2004 | Patel et al. | |
| 2005/0022020 A1 | 1/2005 | Fremberg | |
| 2005/0031110 A1 | 2/2005 | Haimovich et al. | |
| 2005/0157708 A1 | 7/2005 | Chun | |
| 2005/0177622 A1 | 8/2005 | Spielman et al. | |
| 2005/0197110 A1 | 9/2005 | Hasan et al. | |
| 2005/0212749 A1 | 9/2005 | Marvit | |
| 2005/0272413 A1 | 12/2005 | Bourne | |
| 2005/0273333 A1 | 12/2005 | Morin et al. | |
| 2006/0034336 A1 | 2/2006 | Huh et al. | |
| 2006/0035657 A1 | 2/2006 | Lim | |
| 2006/0068731 A1 | 3/2006 | Seier | |
| 2006/0104218 A1 | 5/2006 | Kako | |
| 2006/0105790 A1 | 5/2006 | Jin et al. | |
| 2006/0116175 A1 | 6/2006 | Chu | |
| 2006/0126529 A1 | 6/2006 | Hardy | |
| 2006/0147002 A1 | 7/2006 | Desai et al. | |
| 2006/0206454 A1 | 9/2006 | Frostall et al. | |
| 2006/0239277 A1 | 10/2006 | Gallagher | |
| 2007/0036322 A1 | 2/2007 | Goldman et al. | |
| 2007/0037610 A1 | 2/2007 | Logan | |
| 2007/0064908 A1 | 3/2007 | Levy et al. | |
| 2007/0112571 A1 | 5/2007 | Thirugnana | |
| 2008/0059578 A1 * | 3/2008 | Albertson et al. | 709/204 |

FOREIGN PATENT DOCUMENTS

| | | |
|---|---|---|
| EP | 1731995 | 12/2006 |
| GB | 2347593 | 9/2000 |
| WO | WO 2005/104520 | 11/2005 |
| WO | WO 2006/028514 | 3/2006 |
| WO | WO 2006/071420 | 7/2006 |

OTHER PUBLICATIONS

China, The First Office Action, Chinese Appln. No. 200880022939.0, Serial No. 2012052800963230, with translation, emailed Oct. 10, 2012, May 31, 2012.

China, The Second Office Action, Chinese Appln. No. 200880022939.0, Serial No. 2012052800963230, with translation, emailed Apr. 10, 2013, Apr. 10, 2013.

China, The Original Office Action, Chinese Appln. No. 200880022939.0, Serial No. 2013090600765570 with description of the claims translated, emailed Sep. 11, 2013, Sep. 11, 2013.

* cited by examiner

RECOGNITION OF HUMAN GESTURES BY A MOBILE PHONE

TECHNICAL FIELD

The present disclosure relates generally to the fields of mobile communications and telephony.

BACKGROUND

Modern conferencing systems facilitate communications among multiple participants over telephone lines, Internet protocol (IP) networks, and other data networks. In a typical conferencing session, a participant enters the conference by using an access number. During a typical conference session a mixer receives audio and/or video streams from the participants, determines the N loudest speakers, mixes the audio streams from the loudest speakers and sends the mixed media back to the participants.

One drawback of existing conferencing systems is that the participants often lack the ability to observe each other's body language. By its nature, body language communication is bidirectional; that is, it allows a listener to convey his feelings while he is listening to a speaker. For audio-only participants, this means that a speaker is unable to see the facial expressions, head nods, arm gesticulations, etc., of the other participants.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
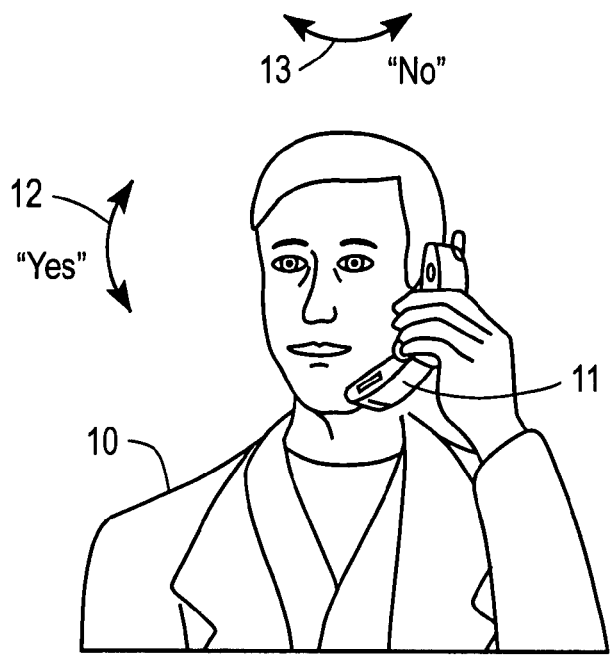
FIG. 1 illustrates an example of a person making head gestures while listening to a speaker on the other end of the call.

In the following description specific details are set forth, such as device types, components, communication methods, etc., in order to provide a thorough understanding of the disclosure herein. However, persons having ordinary skill in the relevant arts will appreciate that these specific details may not be needed to practice the embodiments described.

In the context of the present application, a communication network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the endpoint devices or nodes may include servers, video conferencing units, video terminals, and personal computers. The nodes typically communicate by exchanging discrete frames or packets of data according to predefined protocols.

A conferencing system, as that term is used herein, comprises software and/or hardware (including firmware) components integrated so as to facilitate the live exchange of voice and, in certain implementations, other information (audio, video or data) among persons participating via endpoint devices at different remote locations. A conference session may involve point-to-point or multipoint calls over a variety of network connections and protocol types.

An endpoint is a device that provides media communications termination to an end user, client, or person who is capable of participating in an audio conference session via a conferencing system. Endpoint devices that may be used to initiate or participate in a conference session include a mobile phone, a personal digital assistant (PDA), a voice over Internet protocol (VoIP) phone, a personal computer (PC), such as notebook, laptop, or desktop computer; an audio/video appliance; or any other device, component, element, or object capable of initiating or participating in exchanges with an audio (or audio/visual) conferencing system.

Overview

In one embodiment, a mobile phone (or an earpiece that communicates with a mobile phone or telephone base unit) incorporates a built-in motion detector. The motion detector is configured so as to capture head and/or hand gestures of the user and convey them to a remote speaker. For example, an individual equipped with such a mobile phone who participates in an audio conference session may shake their head in a gesture of approval (up/down movement of the head) or disapproval (side-to-side movement of the head) of the statements he is hearing from the remote speaker. This gesticular information is captured and communicated back to the speaker so as to provide the speaker with communication feedback.

In accordance with a specific embodiment, a standard motion-activated dual switch motion detector is incorporated into a mobile phone (or detached earpiece unit) to detect both vertical and horizontal head shaking. In another embodiment, a gyroscopic device may be utilized to provide more precise detection of movements of the user's head, which may include differentiating between casual head movements not intended to convey information, a slight head nod, and more intense or vigorous head gestures intended to strongly convey agreement or disagreement with the speaker's message.

Head gestures of a user may be analyzed at the earpiece to determine whether the motion detected is affirmative (i.e., intended to communicate approval), negative (i.e., intended to communicate disapproval), or non-communicative (i.e., not intended to be a communicative gesture, such as a casual turning of the head). Alternatively, the sensed motion of the detector may be transmitted to another device, unit, or network node (e.g., server) for further analysis and subsequent transmission to the speaker and/or other participants to the discussion.

While many mobile phones incorporate video cameras, they lack the ability to capture the speaker's body language and convey that body language to another listener. As a result, a call over a mobile phone tends to be unidirectional, i.e., lacking in communication of gesticular information from the listener to the speaker.

FIG. 1 illustrates an example of a person 10 making head gestures while listening on his mobile phone 11 to a speaker on the other end of the call. Mobile phone 11 is equipped with a built-in motion detector (e.g., element 23 in FIG. 2) that is operable to capture the affirmative up-and-down head nodding motion (shown by arced arrow 12) and the negative side-to-side head motion (shown by arced arrow 13) of user 10. Mobile phone 11 also includes standard microphone and loudspeaker components housed in a unit configured such that the loudspeaker may be positioned near or against an ear of a user, with the microphone being positioned to capture speech of the user.

Practitioners in the art will appreciate that instead of talking directly into mobile phone 10, user 10 may utilize a headset or earpiece that communicates with the mobile phone or another telephone base unit via a wireless (e.g., Bluetooth) or wired connection. The information communicated by the headset or earpiece may include speech (voice) as well as the motion signals or gesture information detected by the motion detector incorporated into the headset or earpiece.

Figure 2:
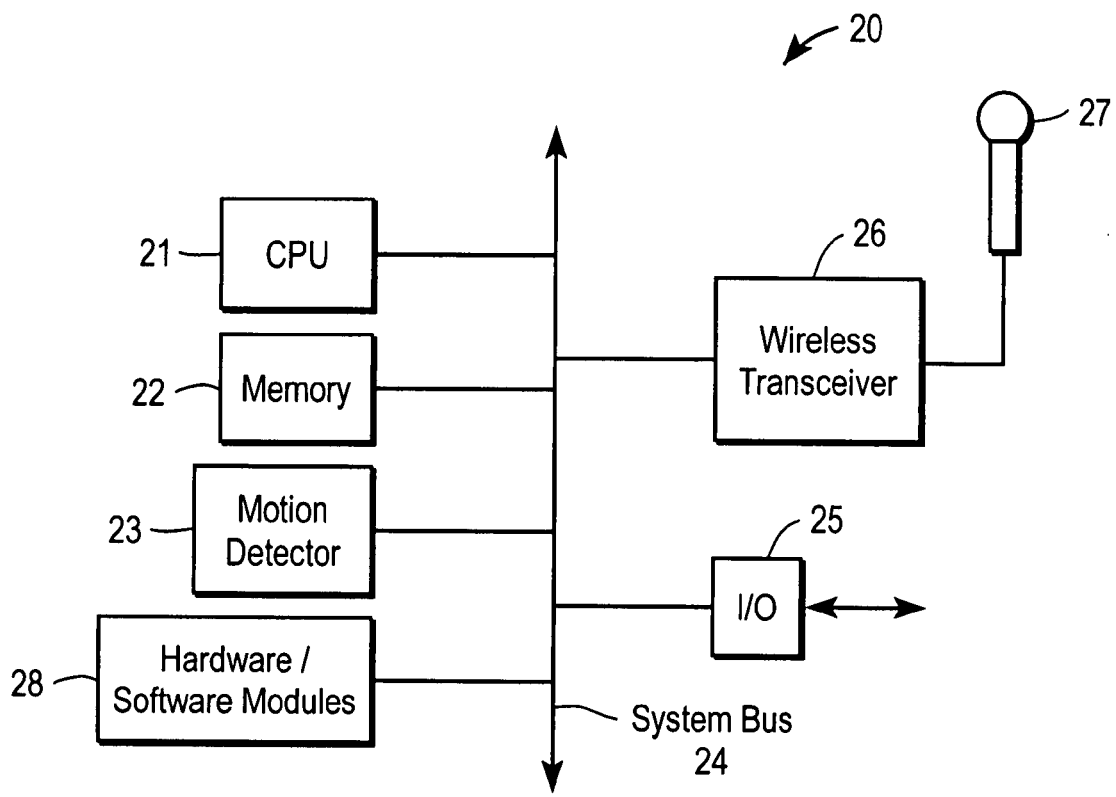
FIG. 2 illustrates an example architecture of a mobile phone that incorporates a motion detector.

FIG. 2 illustrates an example architecture of a mobile phone 20 that incorporates a motion detector 23 coupled with a central processing unit (CPU) 21 via a system bus 24. Also coupled to systems bus 24 is a memory 22, a wireless transceiver 26, and an input/output (I/O) unit 25. Wireless transceiver 26 is shown coupled with an associated antenna 27. Mobile phone 20 also includes standard microphone and loudspeaker components (not shown) coupled to CPU 21 and wireless transceiver 26 for voice communications with a remote person (or machine) during a call. CPU is operable to place a call over a network via wireless transceiver 26 to a remote endpoint. Additionally, during a call to an endpoint, motion detector 23 sends directional movement information (i.e., signals) to CPU 21. CPU 21 analyzes the detected movements as being affirmative, negative, or non-communicative. Hardware, software and/or firmware modules 28 are coupled with CPU 21 for optional analysis of the motion signals produced by detector 23. For example, gesture recognition software may be used to precisely distinguish and interpret certain head movements. In other embodiments, the analysis of the signals produced by motion detector 23 may be performed by some other network node. CPU 21 also selects the appropriate sensory output (e.g., audible and/or visual) for the particular type of gesture determined from the motion signals received from detector 23.

Additionally, CPU 21 may run software (or firmware) specifically aimed at recognizing alphanumeric characters, thereby permitting a user of mobile phone to spell certain characters (e.g., the letter "A" or the number "8") to facilitate man-machine interactions. For instance, in the case where an interactive voice response (IVR) system has difficulty understanding a user's voice command or input, the user may spell the misunderstood character or word through appropriate movement of his mobile phone (e.g., by moving the mobile phone in his hand in a manner so as to trace the character(s) in space).

In one embodiment, CPU 21 may establish via wireless transceiver 26 a data communication channel between mobile phone 20 and an endpoint device at the other end of the call. All gesture information is transmitted over the data channel to the remote speaker's endpoint. For example, upon receiving the listener's head gesture information, the speaker's endpoint may play, as a background "whisper" tone, a voice file which resembles the approval sound of "aha" or the disapproval sound of "mm mm". The stronger and sharper the head gestures of the listener, the louder the approval and disapproval sounds that are played to the speaker.

In another embodiment, the remote speaker's endpoint device may be configured so that the head gestures of the listener at the other end of the call may be conveyed to the speaker using visual indicators such as light-emitting diodes (e.g., green for approval, red for disapproval) or a written message on a display screen, e.g., stating that the listener is shaking his head in agreement or disagreement.

Figure 3:
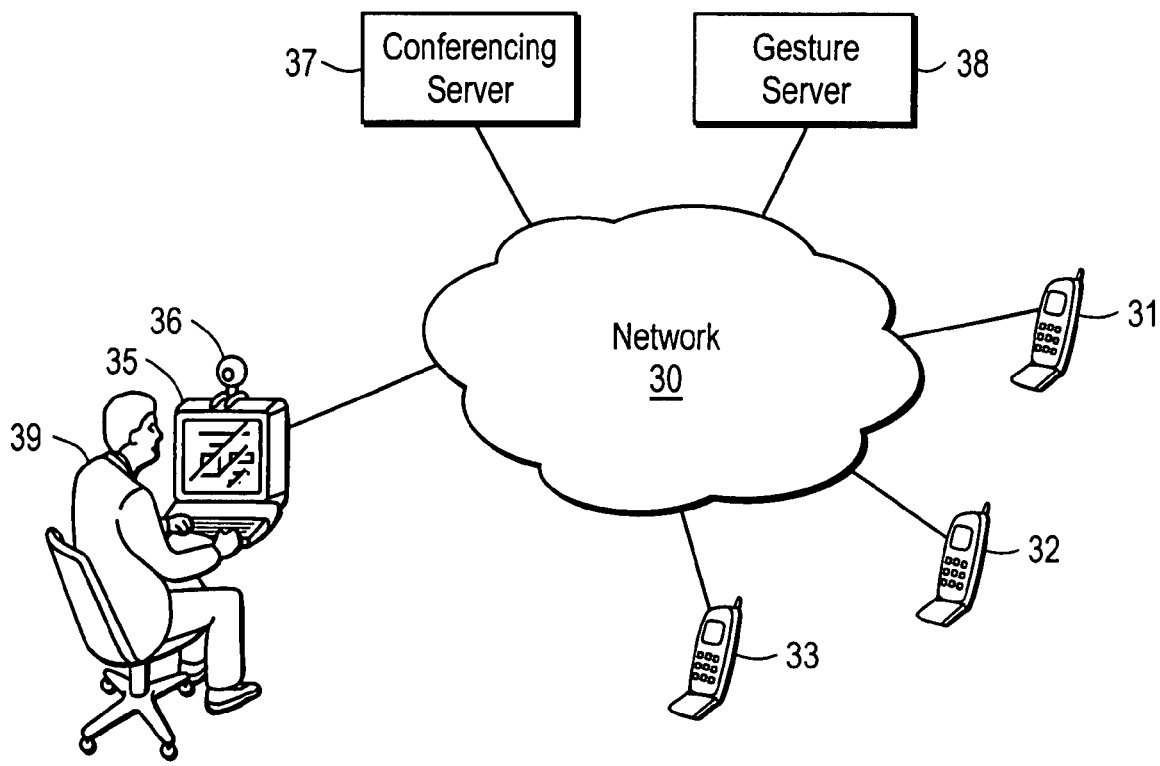
FIG. 3 illustrates an example conferencing system.

FIG. 3 illustrates an example conferencing system that includes a conferencing server 37 and a gesture server 38 connected via a network 30 with a plurality of endpoints that includes mobile phones 31-33 and a personal computer (PC) 35 equipped with a camera 36. Each of mobile phones 31-33 is equipped with a built-in motion detector to detect the head gestures of each associated user/participant. PC 35 may also be configured with software (or firmware) for analyzing and interpreting the gestures of user 39 captured by camera 36.

In the embodiment shown, conferencing server 37 includes a digital signal processor (DSP) or firmware/software-based system that mixes and/or switches audio signals received at its input ports under the control of server 37. The audio signals received at the conference server ports originate from each of the conference or meeting participants (e.g., individual conference participants using endpoint devices 31-33 and 35), and possibly from an interactive voice response (IVR) system (not shown).

Conferencing server 37 and gesture server 38 both include software (or firmware) plug-ins or modules that implement the various features and functions described herein. In one implementation, conferencing server 37 is responsible for establishing and maintaining control and media channels between the various participant endpoint devices, as well as managing the mixing of the participant's speech. Gesture server 38, on the other hand, is responsible for handling the data channel communications over which gesture information is transmitted between the current speaker and listeners. In addition, gesture server may process the received gesture information to produce statistics and/or other types of gesture feedback information to the speaker.

By way of example, assume that a conference session is underway with participant 39 currently speaking to the participants who are using mobile phones 31-33. Further assume that phones 31 & 32 detect head gestures indicative of approval, with phone 33 detecting a disapproving head gesture. In such a scenario, gesture server may produce output feedback information transmitted to PC 35 consisting of an "aha" followed by an "mm mm" at PC 35—the volume of the "aha" being twice as loud as the "mm mm" to reflect the 2:1 approval to disapproval ratio.

It is appreciated that in different specific implementations the media path for the conference participants may include audio/video transmissions, e.g., Real-Time Transport Protocol (RTP) packets sent across a variety of different networks (e.g., Internet, intranet, PSTN, wireless, etc.), protocols (e.g., IP, Asynchronous Transfer Mode (ATM), Point-to-Point Protocol (PPP)), with connections that span across multiple services, systems, and devices. For instance, although not explicitly shown, the connection path to each of mobile phones 31-33 may comprise connections over wireless provider networks and through various gateway devices.

Figure 4:
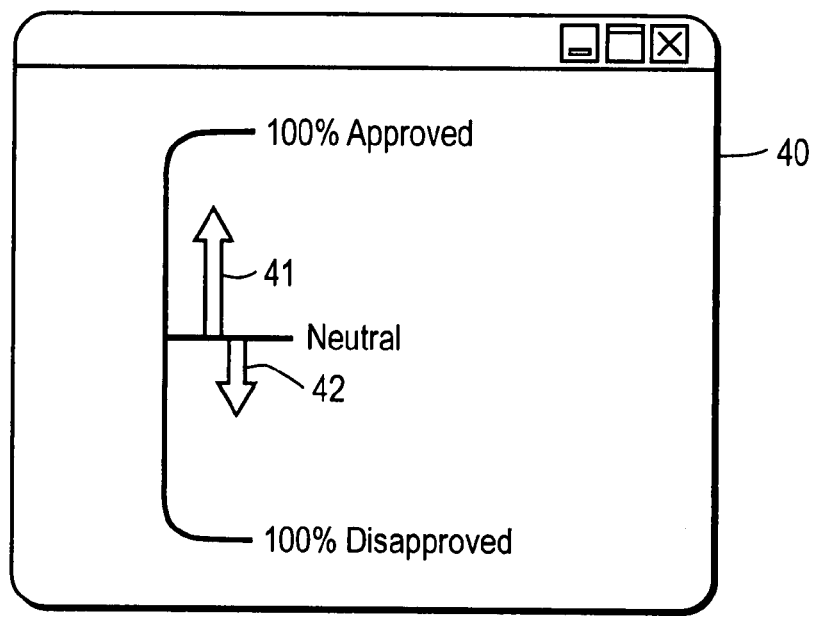
FIG. 4 illustrates an example window appearing on the display screen of an endpoint shown in the conferencing system of FIG. 3.

FIG. 4 illustrates an example window 40 appearing on a display screen of PC 35 in the conferencing system of FIG. 3. In this embodiment, software running on PC 35 graphically displays the gesture feedback information received from gesture server 38. In this example, multiple users (i.e., users of phones 31-33) are listening to a lecture or participating in a conference with speaker 39. Window 40 provides speaker 39 with visual feedback regarding the number of listeners who approve versus the number of listeners who disapprove (or do not understand). For instance, FIG. 4 graphically shows the percentage of listeners who approve with what they are hearing as arrow 41, and the percentage of listeners who disapprove with what they are hearing as arrow 42. In this case, arrow 41 is twice as large (long) as arrow 42, reflecting the fact that two listeners approver, and one listener disapproves, of the message that speaker 39 is delivering. Other types of visual indicators may also graphically display the number of neutral people whose head motion does not reveal any gestures.

Practitioners in the art will understand that the window 40 may be generated by graphical user interface software (i.e., code) running a user's PC or other endpoint device. In other cases, the GUI may comprise a collaborative web-based application that is accessed by the browser software running on an endpoint. In other instances, the GUI may comprise a downloaded application (e.g., downloaded from gesture server 38) or other forms of computer-executable code that may be loaded or accessed by a participant's PC, mobile phone, or other endpoint device. For instance, the software code for implementing the GUI may be executed on server 38 and accessed by users who want to utilize the features provided therein. In the case of a mobile phone with a display screen, the screen may display current approval/disapproval statistics while the user is talking via a headset or earpiece communicatively coupled with the mobile phone.

By regularly monitoring window 40 during the time that he is talking, speaker 39 can tailor his speech or discussion to his listeners. For instance, speaker may decide to skip certain material, charge forward faster, slow down, or reiterate his last point in a different way, depending upon the gesture feedback information received from the listening audience. In other words, speaker 39 may tailor the delivery of his message, e.g., by altering the content and delivery speed, based on the body language (head gestures) communicated via interface window 40.

Note that the gesticular information collected and statistics generated by server 38 regarding the body language of the listeners may also be conveyed and shared among all of the participants. Also, the sharing of gesticular information is dynamic and bidirectional, meaning that when the user of mobile phone 31 asks a question or takes the floor (e.g., in a half duplex or push-to-talk (PTT) environment), the non-verbal gestures of user 39 and the users of mobile phones 32 & 33 may be captured and conveyed to mobile phone 31 in a manner as described above. In a PTT environment, the conferencing system may also be configured or adapted to capture and interpret brief verbal sounds or comments, such as "yes", "no", "aha, "mm mm", etc., and include them along with non-verbal gestures when generating statistical feedback to the speaker regarding approval/disapproval of the group of listeners. This affirmative/negative feedback information may be transmitted on a low bandwidth channel (e.g., control signal channel) separate from the voice path or main communication channel.

It should be understood that conferencing server 37 and gesture server 38 do not have to be implemented as separate components or nodes on network 30. In other words, the functions of each may be integrated or incorporated into a single server of node residing on the network.

Figure 5:
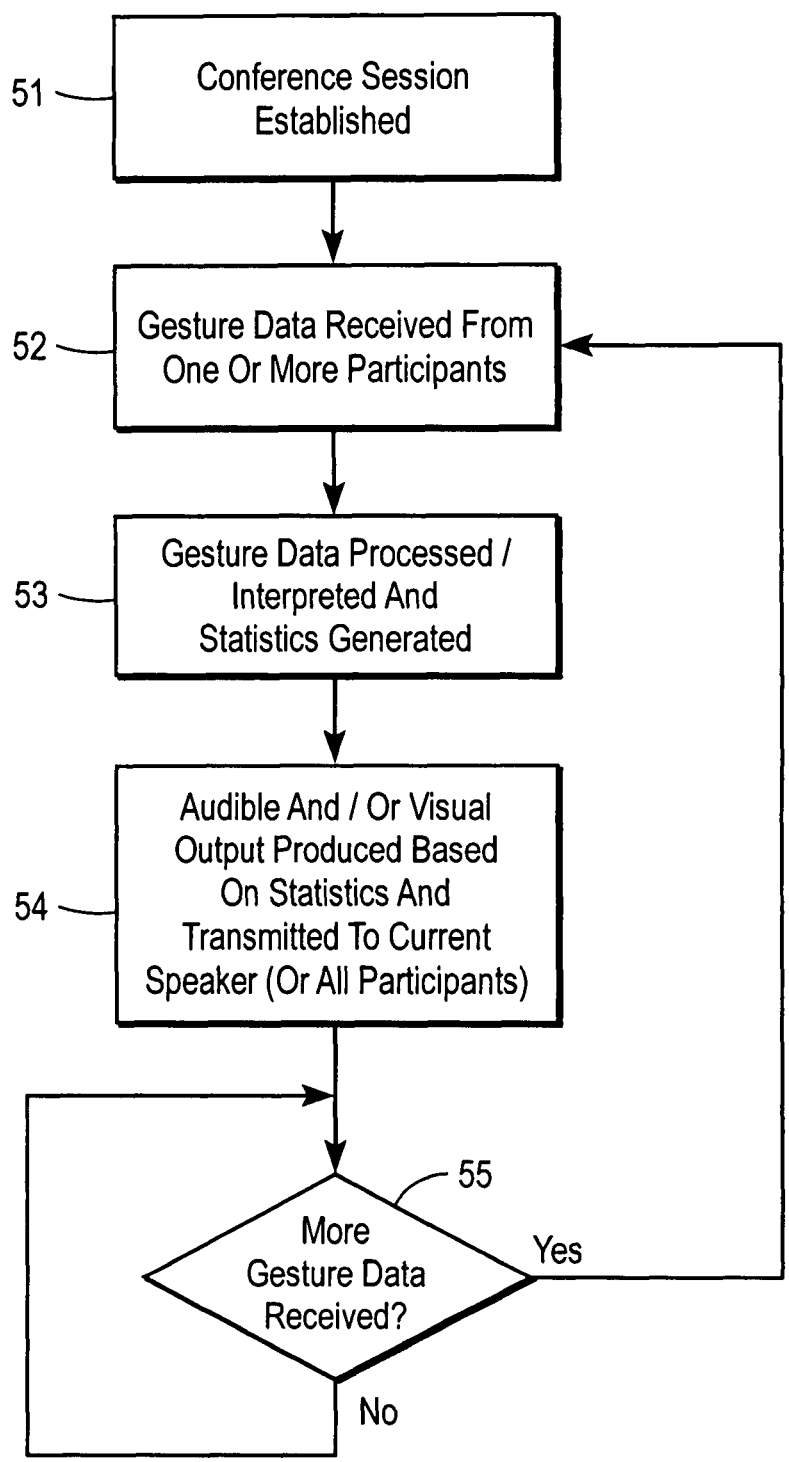
FIG. 5 illustrates an example method of operation for the conferencing system of FIG. 4.

FIG. 5 illustrates an example method of operation for the conferencing system of FIG. 4. The process begins with the conference session already in progress; that is, the media and control channels to all of the participants have already been established (block 51). At that point, the system waits until it receives gesture information captured by a motion detector associated with or incorporated into an endpoint device. Once gesture data is received from one or more participants (block 52) the system may continue sampling the data received for a predetermined time period. After the sampling period has ended, the sampled data may be processed (e.g., to interpret whether it indicates approval or disapproval) and statistics generated (block 53).

The statistics may include the respective percentages of the listeners who approve or disapprove of the speaker's current statements. In systems where the motion detectors are capable of distinguishing between slight head movements and more demonstrative or dramatic gestures, the system may collect statistics on a broader range of listener reactions. For example, the statistical categories that listeners may fall into may include "strongly approve", "slightly approve", "neutral", "slightly disapprove", and "strongly disapprove".

Once statistics have been generated for a given sampling of listener reactions, the system outputs a feedback response (e.g., audible and/or visual) that is transmitted to the speaker. The specific type of feedback response may be controlled by the gesture server based on the available information about the specific kind of endpoint the speaker is utilizing. The feedback response may also be output to all of the participating listeners, with the type or nature of the response being tailored to the destination endpoint device. This is shown occurring at block 54. Since the system operates dynamically, sampling listener gestures over a predetermined sampling period (e.g., 2 seconds), the system waits again until any additional gesture information is received by any of the participants (block 55). When new or additional gesture data is received, the process returns to block 52. A new sampling period is then initiated, followed by the processing and transmission steps discussed above.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:
1. A method comprising:
receiving affirmative and negative gesture responses from a plurality of audio-only participants of a conference system listening, via a plurality of endpoint devices, to a remote participant of the conference system, the affirmative and negative gesture responses being made in response to one or more statements of the remote participant and electronically detected using the endpoint devices;
generating statistics based on a percentage or number of affirmative gesture responses and a percentage or num- ber of negative gesture responses received from the plurality of audio-only participants;
communicating the statistics to the remote participant via a sensory output.

2. The method of claim 1 wherein the sensory output comprises an audible and/or visual response.

3. The method of claim 1 wherein the detecting occurs during a sampling period.

4. The method of claim 1 wherein the remote participant is connected to the conference session via a communication device having a display screen, and further wherein the communicating of the statistics comprises graphically displaying on the display screen the percentage or number of the affirmative responses and a percentage or number of the negative responses.

5. The method of claim 1 wherein the affirmative and negative gesture responses are detected by sensing head movements of the one or more audio-only participant utilizing motion detectors respectively attached to or incorporated within the endpoint devices of the participants.

6. The method of claim 1 wherein the endpoint devices comprise at least one mobile phone.

7. The method of claim 1 wherein the endpoint devices comprise at least one headset or earpiece device communicatively coupled with a mobile phone.

8. The method of claim 1 wherein the affirmative and negative responses are received via a data or control channel of a network, the data or control channel being separate from a voice channel utilized for communication of the one or more statements to the participants.

9. The method of claim 1 wherein each of the affirmative responses corresponds to an up-and-down head movement and each of the negative responses corresponds to a side-to-side head movement.

10. A system comprising:
a first server that connects with a plurality of endpoint devices each configured with a motion detector for detecting gestures of an audio-only participant of a conference system, the conference system comprising a plurality of audio-only participants, the motion detector producing an affirmative output responsive to an up-and-down gesture and a negative output responsive to a side-to-side gesture, the first server connecting with the endpoint devices over a network; and
a second server coupled over the network with the endpoint devices for receiving the affirmative and negative responses from each of a set of the endpoint devices and for generating an output that reflects a percentage or number of the affirmative responses and a percentage or number of the negative responses received from the plurality of audio-only participants.

11. The system of claim 10 wherein the output comprises an audible and/or visual gesture, and wherein the second server is further operable to communicate the audible and/or visual output to the set of the endpoint devices.

12. An apparatus comprising:
one or more processors; and
a memory comprising one or more instructions executable at the processors, the one or more processors being operable, when executing the instructions, to:
receive affirmative and negative gesture responses from a plurality of audio-only participants of a conference system listening, via a plurality of endpoint devices, to a remote participant of the conference system, the affirmative and negative gesture responses being made in response to one or more statements of the remote participant and electronically detected by the endpoint devices;
generate statistics based on a percentage or number of affirmative gesture responses and a percentage or number of negative gesture responses received from the plurality of audio-only participants; and
communicate the statistics to the remote participant via a sensory output.

13. The apparatus of claim 12 wherein the sensory output comprises an audible and/or visual response.

\* \* \* \* \*